United States Patent [19]
Johnson

[11] Patent Number: 4,840,734
[45] Date of Patent: Jun. 20, 1989

[54] PROCESS FOR ABSORBING LIQUID LEAKS AND SPILLS

[76] Inventor: Edward R. Johnson, 306 Burk Ave., Ridley Park, Pa. 19078

[21] Appl. No.: 125,117

[22] Filed: Nov. 25, 1987

[51] Int. Cl.$^4$ .............................................. B01D 15/00
[52] U.S. Cl. ...................................... 210/660; 134/7; 210/484
[58] Field of Search ................... 134/7; 210/660, 671, 210/680, 690, 691, 242.4, 484, 502.1, 924

[56] References Cited

U.S. PATENT DOCUMENTS

| | | | |
|---|---|---|---|
| 3,414,511 | 12/1968 | Hitzman | 210/671 |
| 3,617,564 | 11/1971 | Vander Hooven | 210/691 |
| 3,739,913 | 6/1973 | Bogosian | 210/242.4 |
| 4,483,716 | 11/1984 | Heller | 210/924 |
| 4,497,712 | 2/1985 | Cowling | 210/691 |
| 4,659,478 | 4/1987 | Stapelfeld et al. | 210/924 |

*Primary Examiner*—Ivars Cintins
*Attorney, Agent, or Firm*—Eugene E. Renz, Jr.

[57] ABSTRACT

A product for absorbing liquid leaks and spills includes at least one closed cell with a cell wall permeable to the liquid. An inorganic, inert absorbent is enclosed within the cell. Liquid contacting the product will pass through the cell wall and will be absorbed by the absorbent. A process for absorbing liquid leaks and spills is also provided.

1 Claim, 1 Drawing Sheet

PROCESS FOR ABSORBING LIQUID LEAKS AND SPILLS

BACKGROUND OF THE INVENTION

1. Field of the Invention

This invention relates generally to products for removing liquid leaks and spills, and more particularly to products for absorbing liquid leaks and spills.

2. Description of the Prior Art

The problem of liquid leaks and spills has gained increased attention owing to concerns about pollution of the environment and contamination of the work place. Liquid chemical spills in oceans, lakes and streams must be removed to protect aquatic life, birds and animals, as well as to prevent contamination of water used by humans. Leaks and spills of liquids in the work place must be removed to prevent exposure of workers to these chemicals and also to prevent accidents which occur as the result of wet floors and machinery.

A number of products and methods have been developed to remove liquid leaks and spills. One such method is to loosely distribute an absorbent material such as straw on the liquid and to remove the absorbent by suitable mechanical means. Vander Hooven, et al, U.S. Pat. No. 3,617,564, discloses the use of low-density corncob components to absorb oils or oil substances from water and land areas. These products are themselves difficult to remove. The loose particles are slippery, being therefore hazardous, and also difficult to fully confine since they can often be blown about by the wind or other agitation. These products are troublesome to store in any quantity, and to transport to the site of the spill. The loose product cannot be positioned with precision in locations that are difficult to reach, or to absorb a continuing leak at a particular location in a piece of machinery.

SUMMARY OF THE INVENTION

It is an object of the invention to provide a product which will efficiently absorb liquid leaks and spills.

It is another object of the invention to provide a product which can be easily stored.

It is still another object of the invention to provide a product which can be easily applied to liquid leaks and spills.

It is another object of the invention to provide a product which can be easily positioned in particular locations.

It is yet another object of the invention to provide a product which can be confined to a particular location.

It is still another object of the invention to provide a product which will be chemically inert.

It is another object of the invention to provide a product which can be used with hazardous chemicals.

These and other objects are accomplished by a product for absorbing liquid leaks and spills comprising at least one closed cell with a cell wall permeable to said liquid. An inorganic, inert absorbent is enclosed within the cell. Liquid contacting the product will pass through the cell wall and will be absorbed by the absorbent.

The cell wall preferably is in the form of an elongated tube that is closed at each end. Tubular cells provide a wicking action and are convenient to position in particular locations. The tubes also are easy to handle and to store.

Two opposing sheets of cell wall material can be used to form multiple cells. The opposing sheets, which can be fashioned from a single folded sheet, are joined at perimetric edges thereof with the absorbent therebetween. One or more seams interior of the perimetric edges can be used to form cells within the perimetric edges. Smaller cells keep the absorbent from collecting in lumps within the cell. The interior seams are preferably substantially parallel to one another whereby at least two tubular cells are formed.

The cell wall is preferably constructed from a fibrous material. The fibrous material preferably is cotton, but could also be other natural synthetic fibers. The cell wall must contain the absorbent and be permeable to the liquid. It is preferable to provide a specific material for the job at hand. The material can be specially selected and treated for laboratory use. Other materials can be specially selected for use with particular chemicals which might otherwise react with the cell wall material. A preferable material is terry cloth.

The absorbent preferably is an inorganic, inert material capable of absorbing large amounts of liquid relative to the weight and volume of the absorbent. Suitable absorbent materials include vermiculite, clay, perilite, diatomaceous earth, hydrous aluminum silicate and calcium carbonate. Vermiculite is a preferable absorbent. It is also possible to use mixtures of different absorbent materials to optimize the properties of the absorbent for the particular liquid and job at hand.

A process is provided for absorbing liquid leaks and spills. The process includes the step of providing the liquid absorbing product of the invention and contacting the product with the liquid to be absorbed.

It is preferable, when using the invention in connection with acid spills, to employ a synthetic fibrous material as the cell wall material which is chemically resistant to acids, for example, a polyester. In addition, a filler may be utilized which neutralizes the acid, for example, calcium carbonate alone or in combination with other fillers.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

The invention provides a product for absorbing liquid leaks and spills with at least one closed cell having a cell wall permeable to the liquid. An inorganic, inert absorbent is enclosed within the cell such that liquid contacting the product will pass through the cell wall and will be absorbed by the absorbent. The cell wall is preferably formed into the shape of a cylinder. The cell wall 10 is formed as an elongated tube that is closed at either end by inside end seams 12. An additional pair of outside end seams 14 are preferably provided to prevent accidental opening of the ends.

The absorbent 18 is preferably granular and is loosely packed within the cell wall 10. The amount of absorbent 18 packed into the cell is preferably selected so as to be sufficiently snug so that the individual absorbent particles cannot move about a great deal within the cell. This prevents lumping in the cell. The amount of the absorbent in the cell should also not be so tight that the cell cannot be bent and positioned. This allows the cell to be positioned in unusual spaces, for example, around corners.

Figure 1:
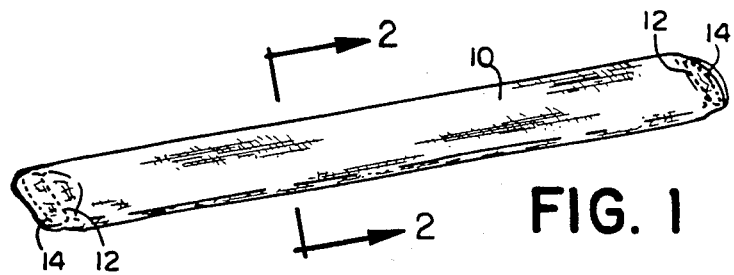
FIG. 1 is a perspective view of a product according to the invention.
Figure 2:
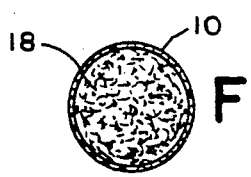
FIG. 2 is a cross-section taken along line 2—2 in FIG. 1.
Figure 3:
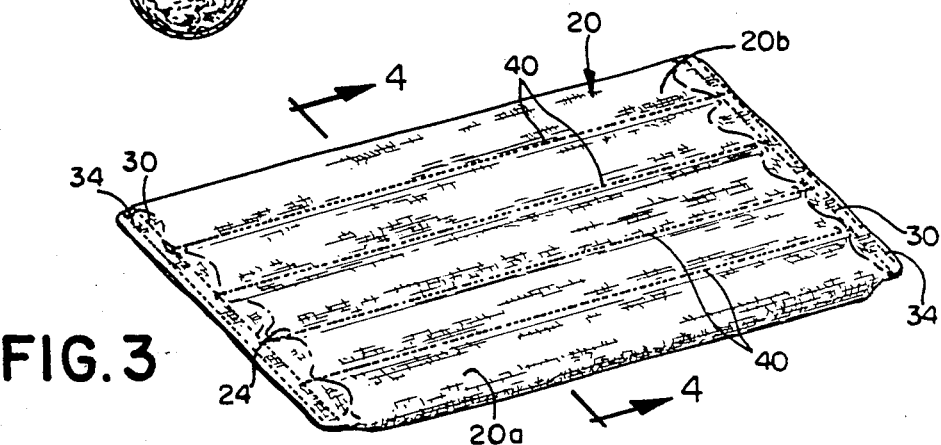
FIG. 3 is a perspective view of an alternative embodiment.
Figure 4:
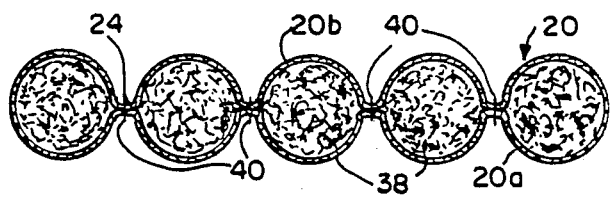
FIG. 4 is a cross-section taken along line 4—4 in FIG. 3.

An alternative embodiment is depicted in FIGS. 3-4. It is preferable in treating large leaks and spills to attach several cells together. Absorbent particles may become unevenly distributed within large cells. Smaller cells help to prevent the formation of lumps within a cell. This can be accomplished by lengthwise attaching several of the elongated cellular tubes into a packet that is easily positioned in irregular spaces. The several cells can be integrally formed from opposing sheets of cell wall material, which can be formed from a single folded sheet of material. The sheets are joined at perimetric edges to enclose absorbent therebetween. At least one interior seam is provided to segregate the absorbent into individual cells. In FIGS. 3-4 there is shown a packet in which a single sheet of material has been folded over to form opposing sheets of the cell wall material. A first side 20a opposes a second side 20b of a single folded sheet 20. The folded ends of the sheet 20 are joined at a seam 24. Perimetric ends of the material can be joined by inside seams 30 and outer seams 34. The absorbent 38 is positioned between the opposing sides 20a and 20b. A plurality of interior seams 40 are provided to segregate the absorbent 38 into smaller cells. The interior seams 40 preferably are parallel so as to form a plurality of tubular cells.

The absorbent preferably is selected from a number of inert, inorganic materials capable of absorbing an excessive amount of liquid relative to the weight and volume of the absorbent. The absorbent preferably is capable of absorbing not only waters and oils, but also hazardous materials. Preferable absorbents include clay, vermiculite, and perilite, diatomaceous earth, hydrous aluminum silicate, calcium carbonate. Vermiculite is a preferred absorbent. It is desirable, where acidic or otherwise reactive chemicals are being removed, to provide an absorbent which will neutralize the chemical. Calcium carbonate, for example, is a suitable absorbent for neutralizing acidic chemicals.

Figure 5:
FIG. 5 is a perspective view of another alternative embodiment.

The cell wall can be constructed of a material that is permeable to the liquid or otherwise must permit passage of the liquids. The material can be specifically selected to be permeable to a specific liquid. The material can also be specially adapted for specific uses, for example in the laboratory. Certain hazardous chemicals will require proper selection of a cell wall material to avoid chemical reactions. Acidic or otherwise reactive chemicals will normally require the selection of a material that is resistant to reaction. Polyester is an example of one such material that is resistant to acidic chemicals. Cotton is, in the usual instance, a preferred cell wall material. The cotton can be formed as terry cloth in a preferred embodiment. There is shown in FIG. 5 a tubular product 34 suitable for use in a laboratory in which the cell wall material 48 is constructed of terry cloth.

This invention can be embodied in other specific forms without departing from the spirit or essential attributes thereof, and accordingly, reference should be made to the following claims rather than to the foregoing specification as indicating the scope of the invention.

I claim:

1. A method for absorbing acidic liquid leaks and spills, comprising:

contacting said acidic liquids with a product having at least one closed cell formed from an elongated tube having walls of an acid resistant fibrous material which is permeable to the acidic liquid, said tube having vermiculite in said tube as an absorbent in an amount sufficient to fill said tube to substantially restrict movement of individual vermiculite particles while permitting positioning of said tube, and end seams at both ends of said tube having inside end seams and outside end seams at both of said ends to contain said vermiculite therein;

and removing said product after a quantity of acidic liquid has been absorbed.

* * * * *